(12) United States Patent
Dotan et al.

(10) Patent No.: US 9,397,992 B1
(45) Date of Patent: Jul. 19, 2016

(54) AUTHENTICATION USING COLOR-SHAPE PAIRINGS

(71) Applicant: EMC Corporation, Hopkinton, MA (US)

(72) Inventors: Yedidya Dotan, Newton, MA (US); Daniel V. Bailey, Pepperell, MA (US); Lawrence N. Friedman, Arlington, MA (US); Gareth Richards, Woodstock (GB)

(73) Assignee: EMC Corporation, Hopkinton, MA (US)

( * ) Notice: Subject to any disclaimer, the term of this patent is extended or adjusted under 35 U.S.C. 154(b) by 159 days.

(21) Appl. No.: 14/143,779

(22) Filed: Dec. 30, 2013

Related U.S. Application Data (60) Provisional application No. 61/894,658, filed on Oct. 23, 2013.

(51) Int. Cl.
*H04L 29/06* (2006.01)
(52) U.S. Cl.
CPC .............. *H04L 63/08* (2013.01); *H04L 63/083* (2013.01); *H04L 63/10* (2013.01)
(58) Field of Classification Search
CPC ........ G06F 21/316; G06F 21/32; G06F 21/36
USPC .................................. 726/7, 16, 19
See application file for complete search history.

(56) References Cited

U.S. PATENT DOCUMENTS

| | | | |
|---|---|---|---|
| 6,038,595 A | 3/2000 | Ortony | |
| 8,145,912 B2 * | 3/2012 | McLean | G06F 21/36 713/182 |
| 8,453,232 B1 | 5/2013 | Gallagher et al. | |
| 8,656,455 B1 | 2/2014 | Bailey et al. | |
| 8,701,199 B1 | 4/2014 | Dotan et al. | |
| 8,726,405 B1 | 5/2014 | Bailey et al. | |
| 8,752,144 B1 | 6/2014 | Kaufman et al. | |
| 8,752,146 B1 | 6/2014 | van Dijk et al. | |
| 8,756,672 B1 * | 6/2014 | Allen et al. | ........................ 726/7 |
| 8,782,775 B2 * | 7/2014 | Fadell et al. | .................... 726/16 |

(Continued)

OTHER PUBLICATIONS

"The MVP Web-Based Authentication Framework", (Short Paper), Sonia Chiasson et al., International Financial Cryptography Association, Ottawa, Canada, FC 2012, LNCS 7397, 2012, pp. 16-24.

*Primary Examiner* — Izunna Okeke
*Assistant Examiner* — Hee Song
(74) *Attorney, Agent, or Firm* — BainwoodHuang (57) ABSTRACT

A technique provides access control. The technique involves prompting a user to enter color-shape pairings, and receiving multiple color-shape pairings from the user. Each color-shape pairing includes (i) a color selection from multiple selectable colors and (ii) a shape selection from multiple selectable shapes. The technique further involves generating an access control result based on the received multiple color-shape pairings, the access control result controlling access to a set of protected resources. For example, color segments can be displayed on a touch screen in the form of a color wheel, and multiple shapes can be rendered within each color segment. Alternatively, (i) a color palette including the multiple selectable colors and (ii) a shape menu including the multiple selectable shapes can be rendered on the touch screen to prompt the user to provide drag and drop gestures over the touch screen. Other configurations are suitable for use as well.

12 Claims, 8 Drawing Sheets

(56) References Cited

U.S. PATENT DOCUMENTS

| | | |
|---|---|---|
| 8,813,026 B1 | 8/2014 | Vobugari et al. |
| 8,881,251 B1 | 11/2014 | Hilger |
| 8,886,751 B1 | 11/2014 | Hackett |
| 8,955,076 B1 | 2/2015 | Faibish et al. |
| 9,009,814 B1* | 4/2015 | Wertz ................ G06F 21/46 713/168 |
| 9,119,539 B1 | 9/2015 | Dotan et al. |
| 2004/0066274 A1* | 4/2004 | Bailey ........................ 340/5.3 |
| 2006/0053285 A1* | 3/2006 | Kimmel et al. ............ 713/166 |
| 2006/0206919 A1* | 9/2006 | Montgomery et al. ......... 726/2 |
| 2009/0038006 A1* | 2/2009 | Traenkenschuh ...... G06F 21/36 726/21 |
| 2010/0322485 A1* | 12/2010 | Riddiford .................. 382/115 |
| 2012/0124654 A1* | 5/2012 | Senac ............................ 726/7 |
| 2012/0166998 A1 | 6/2012 | Cotterill et al. |
| 2012/0304284 A1 | 11/2012 | Johnson et al. |
| 2014/0189819 A1* | 7/2014 | Grimaud ......................... 726/5 |
| 2014/0223378 A1* | 8/2014 | Sinha ........................... 715/836 |

* cited by examiner

AUTHENTICATION USING COLOR-SHAPE PAIRINGS

CROSS REFERENCE TO RELATED APPLICATIONS

This Patent Application is related to U.S. Patent Application No. 61/894,658 filed on Oct. 23, 2013, entitled, "AUTHENTICATION USING COLOR-SHAPE PAIRINGS", the contents and teachings of which are hereby incorporated by reference in their entirety.

BACKGROUND

A conventional mobile platform may require its owner to enter a correct personal identification number (PIN) for access control. If the PIN is correct, the mobile platform grants the owner access to one or more of its resources. However, if the PIN is incorrect, the mobile platform denies access.

Some conventional mobile platforms generate keys from PINs. That is, the entered PINs are provided as inputs to key derivation algorithms which derive keys from the PINs. The derived keys are then used to access resources such as mobile applications, services, confidential data, and so on.

SUMMARY

Unfortunately, there are deficiencies to the above-described conventional mobile platforms which derive keys from PINs. For example, a typical PIN is four to six digits which the owner enters by typing over numbers on a touch screen of the mobile platform. As a result, most keys generated from PINs have very low entropy (e.g., 10-17 bits) thus providing relatively weak security.

To strengthen security, one might consider imposing a requirement that such PINs be longer than six digits. Unfortunately, it is inconvenient and burdensome for an average human to remember relatively long PINs.

In contrast to the above-described conventional mobile platforms which derive keys from PINs, improved techniques are directed to authentication and access control techniques which involve the use of multiple color-shape pairings. Such use of multiple color-shape pairings is capable of providing higher entropy than that provided by a routine PIN (or a normal password). Moreover, depending on how an interface is presented to a user, the interface may enable the user to easily remember enough color-shape pairings to generate substantially higher entropy than that available from conventional PINs. For example, multiple color-shape pairings, in combination with a healthy set of device stable values, can offer at least 128 bits for generation of an effective cryptographic key.

One embodiment is directed to a method of providing access control. The method includes prompting a user to enter color-shape pairings (e.g., by displaying selectable colors and objects on a touch screen). The method further includes receiving, in response to prompting the user and as user input, multiple color-shape pairings. Each color-shape pairing includes (i) a color selection from multiple selectable colors and (ii) a shape selection from multiple selectable shapes. The method further includes generating an access control result based on the received multiple color-shape pairings, the access control result controlling access to a set of protected resources.

In some arrangements, prompting the user to enter color-shape pairings includes displaying a set of color segments on a touch screen, and rendering multiple shapes within each color segment displayed on the touch screen. In these arrangements, receiving the multiple color-shape pairings includes obtaining a series of color-shape pairings in response to the user touching touch screen locations over particular shapes residing in particular color segments.

In some arrangements, displaying the set of color segments on the touch screen includes presenting a color wheel in which the color segments are shown from a starting point in a predefined clockwise order. In these arrangements, the method further includes, during a new authentication operation, prompting the user to enter new color-shape pairings by presenting the color wheel rotated by at least 60 degrees on the touch screen, and rendering multiple shapes within each color segment of the rotated color wheel to receive a new series of color-shape pairings.

In some arrangements, rendering the multiple shapes within each color segment displayed on the touch screen includes presenting a same collection of objects in each of the color segments displayed on the touch screen.

In some arrangements, generating the access control result includes deriving, as the access control result, a key from the series of color-shape pairings obtained in response to the user touching touch screen locations over the particular shapes residing in the particular color segments. In these arrangements, the key is configured to unlock access to the set of protected resources.

In some arrangements, the method further includes decrypting a collection of tokens using the key. Here, each token is configured to unlock access to a respective protected resource of the set of protected resources.

In some arrangements, generating the access control result includes comparing (i) the obtained series of color-shape pairings and (ii) an expected series of color-shape pairings. In these arrangements, generating further includes providing an authentication result indicating whether user authentication is successful based on whether the obtained series of color-shape pairings matches the expected series of color-shape pairings.

In some arrangements, providing the authentication result includes outputting a first authentication result value indicating that user authentication is successful when the obtained series of color-shape pairings matches the expected series of color-shape pairings. In these arrangements, providing the authentication result further includes outputting a second authentication result value indicating that user authentication is unsuccessful when the obtained series of color-shape pairings does not match the expected series of color-shape pairings, the second authentication result value being different from the first authentication result value.

In some arrangements, prompting the user to enter the color-shape pairings includes rendering a color palette on a touch screen, the color palette including the multiple selectable colors, and rendering a shape menu on the touch screen, the shape menu including the multiple selectable shapes. In these arrangements, receiving the multiple color-shape pairings includes obtaining a series of color-shape pairings in response to the user providing drag and drop gestures over touch screen locations to associate particular colors with particular shapes.

In some arrangements, obtaining the series of color-shape pairings includes detecting a series of user swipe motions. Here, each user swipe motion involves the user dragging a particular color from the color palette over a particular shape of the shape menu.

In some arrangements, obtaining the series of color-shape pairings includes detecting a series of user swipe motions.

Here, each user swipe motion involves the user dragging a particular shape from the shape menu over a particular color of the color palette.

In some arrangements, generating the access control result includes deriving, as the access control result, a key from the series of color-shape pairings obtained in response to the user providing drag and drop gestures over touch screen locations. The key is configured to unlock access to the set of protected resources.

In some arrangements, the method further includes decrypting a collection of tokens using the key. Each token is configured to unlock access to a respective protected resource of the set of protected resources.

In some arrangements, generating the access control result includes comparing the obtained series of color-shape pairings with an expected series of color-shape pairings, and providing an authentication result indicating whether user authentication is successful.

In some arrangements, providing the authentication result includes outputting a first authentication result value indicating that user authentication is successful when the obtained series of color-shape pairings matches the expected series of color-shape pairings. In these arrangements, providing the authentication result further includes outputting a second authentication result value indicating that user authentication is unsuccessful when the obtained series of color-shape pairings does not match the expected series of color-shape pairings, the second authentication result value being different from the first authentication result value.

In some arrangements, comparing the obtained series of color-shape pairings with the expected series of color-shape pairings includes confirming that an order of color-shape pairings in the obtained series of color-shape pairings matches an order of color-shape pairings in the expected series of color-shape pairings. For example, the order of color-shape pairings in the obtained series of color-shape pairings can include a sequence of at least three color-shape pairings.

Another embodiment is directed to an electronic apparatus which includes a user interface, memory, and control circuitry coupled to the user interface and the memory. The memory stores instructions which, when carried out by the control circuitry, cause the control circuitry to (A) prompt a user to enter color-shape pairings, (B) in response to prompting the user, receive, as user input, multiple color-shape pairings, each color-shape pairing including (i) a color selection from multiple selectable colors and (ii) a shape selection from multiple selectable shapes, and (C) generate an access control result based on the multiple color-shape pairings, the access control result controlling access to a set of protected resources.

Another embodiment is directed to a computer program product having a non-transitory computer readable medium which stores a set of instructions to provide access control. The set of instructions, when carried out by computerized circuitry, causing the computerized circuitry to perform a method of:

(A) prompting a user to enter color-shape pairings;

(B) in response to prompting the user, receiving, as user input, multiple color-shape pairings, each color-shape pairing including (i) a color selection from multiple selectable colors and (ii) a shape selection from multiple selectable shapes; and (C) generating an access control result based on the multiple color-shape pairings, the access control result controlling access to a set of protected resources.

Yet another embodiment is directed to a method of performing user authentication. The method includes saving a previously used passcode in electronic memory. The previously used passcode is a valid user passcode sufficient to authenticate a particular user. The method further includes training the particular user to enter and remember a new passcode which includes multiple color-shape pairings, each color-shape pairing including (i) a color selection from multiple selectable colors and (ii) a shape selection from multiple selectable shapes. The method further includes performing a set of authentication operations requiring use of the new passcode and, after performing the set of authentication operations requiring use of the new passcode, reinstating the previously used passcode saved in the electronic memory in response to an event to enable the particular user to subsequently authenticate using the previously used passcode.

It should be understood that, in the cloud context, certain electronic circuitry is formed by remote computer resources distributed over a network. Such a computing environment is capable of providing certain advantages such as enhanced fault tolerance, load balancing, processing flexibility, etc.

Other embodiments are directed to electronic systems and apparatus, processing circuits, computer program products, and so on. Some embodiments are directed to various methods, electronic components and circuitry which are involved in authentication and access control involving multiple color-shape pairings.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to an authentication/access control technique which involves use of multiple color-shape pairings. Such use of color-shape pairings is capable of providing greater unpredictability than that provided by a personal identification number (PIN) or a normal password. Furthermore, depending on how an interface is presented to a user, the interface may enable the user to easily remember enough color-shape pairings to generate substantially higher entropy than that available from conventional PINs and passwords. For instance, multiple color-shape pairings in combination with a healthy set of device stable values can offer at least 128 bits for generation of an effective key.

Figure 1:
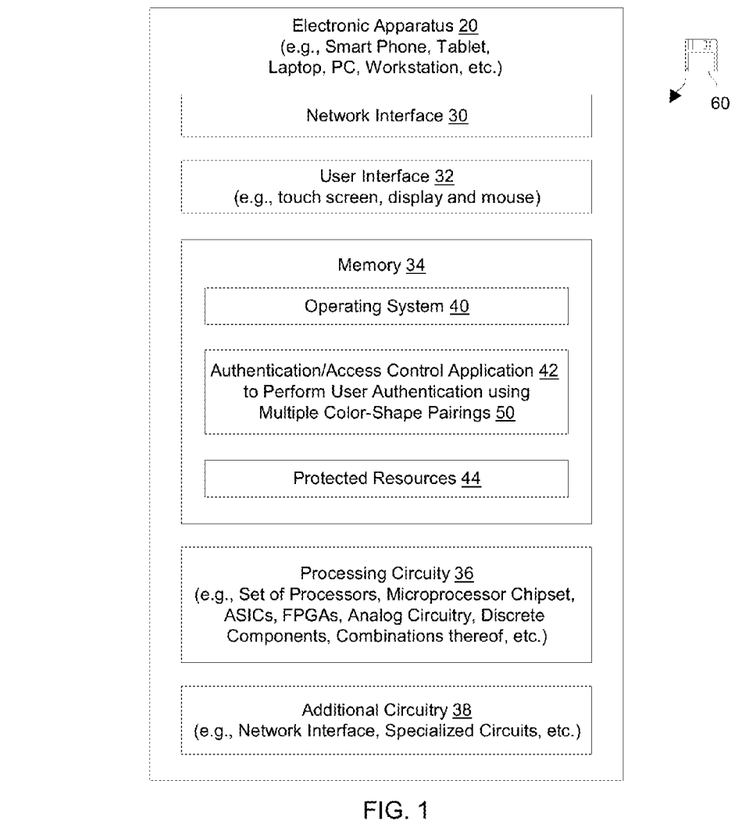
FIG. 1 is a block diagram of an electronic apparatus which is suitable for authentication and providing access control using multiple color-shape pairings.

FIG. 1 shows an electronic apparatus 20 which is suitable for authentication and providing access control using multiple color-shape pairings. The electronic apparatus 20 includes a network interface 30, a user interface 32, memory 34, processing circuitry 36, and additional circuitry 38. Suitable apparatus include smart devices (e.g., smart phones, tablets, personal assistants, etc.), general purpose computers (e.g., desktop computers, workstations, laptops, etc.), specialized computer equipment (e.g., interfaces to navigational equipment, games, smart TVs, other controls, etc.) and so on.

The network interface 30 is constructed and arranged to connect the electronic apparatus 20 to a communications medium (e.g., the Internet, a LAN, a VPN, the network of an enterprise, etc.). Accordingly, the network interface 30 enables the electronic apparatus 20 to communicate with the other components of an electronic environment such as an authentication server, protected resource servers, and so on. Such communications may be copper-based or wireless (i.e., IP-based, SAN-based, cellular, Bluetooth, combinations thereof, and so on).

The user interface 32 is constructed and arranged to receive user input from, and provide user output to a user of the electronic apparatus 20. In the context of a smart device such as a smart phone, a tablet, etc., the user interface 32 can include, among other things, a touch screen that receives coordinate selections in response to user touches, as well as user gestures in response to swiping motions. In the context of a laptop, personal computer, or user workstation, the user interface 32 can include a keyboard, a pointing device (e.g., a mouse, a touch pad, a trackball, etc.), a keyboard, an electronic display or monitor, and so on.

The memory 34 is intended to represent both volatile storage (e.g., DRAM, SRAM, etc.) and non-volatile storage (e.g., flash memory, magnetic disk drives, etc.). The memory 34 stores a variety of software constructs including an operating system 40 to control allocation of resources within the electronic apparatus 20, an authentication/access control application 42, and protected resources 44 (e.g., access to applications, content, sensitive data, peripherals, etc.). As will be explained in further detail shortly, the authentication application 42 enables the electronic apparatus 20 to perform authentication/access control based on multiple color-shape pairings 50 which are entered by a user.

The processing circuitry 36 is constructed and arranged to operate in accordance with the various software constructs stored in the memory 34. Such circuitry may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 60 is capable of delivering all or portions of the software to the electronic apparatus 20. The computer program product 60 has a non-transitory (or non-volatile) computer readable medium that stores a set of instructions that controls one or more operations of the electronic apparatus 20. Examples of suitable computer readable storage media include tangible articles of manufacture and apparatus which store instructions in a non-volatile manner such as CD-ROM, flash memory, disk memory, tape memory, and the like.

The additional circuitry 38 includes other hardware that is available to the electronic apparatus 20. Such hardware can include a communications interface (e.g., a network interface, a cellular communications interface, a telephone interface, etc.), specialized circuitry (e.g., a camera, a microphone, a speaker, etc.), and so on. During operation, the processing circuitry 36 executes software constructs stored in the memory 34 in order to enable the user to perform useful work. Along these lines, the processing circuitry 36 when executing the operating system 40 is able to manage various computerized resources such as memory space, processing cycles, and so on. Examples of useful work includes accessing one or more protected resources 44 (e.g., viewing a file, reading email, performing a banking transaction, etc.). Such operation may further involve access to local protected resources 44 of the user devices 22 (e.g., access to run certain apps, unlock access to open the user devices, access to locally stored data, etc.). Alternatively or in combination, such operation may involve access to remote protected resources 44 of external protected resource servers (e.g., remote login access, remote access to content, ability to complete remote transactions, etc.). Other access control activities include installing apps, connecting to different networks, accessing enterprise resources, and so on. Some electronic apparatus 20 may be equipped with special peripherals that enable users to perform additional operations upon successful authentication such as make cellular calls, navigate using maps and GPS circuitry, take pictures, and so on.

Additionally, the processing circuitry 36 when executing the authentication application 42 is able to control access to the protected resources 44 based on color-shape pairings 50 received from the user. In some arrangements, the received color-shape pairings 50 are provided as input to a key derivation algorithm to create (or unlock) cryptographic keys which enable access to the protected resources 44. In other arrangements, the received color-shape pairings 50 are matched against expected color-shape pairings 50 (or hashes are compared) to determine whether authentication is successful. Other authentication arrangements are suitable for use as well. Further details will now be provided with reference to FIG. 2.

Figure 2:
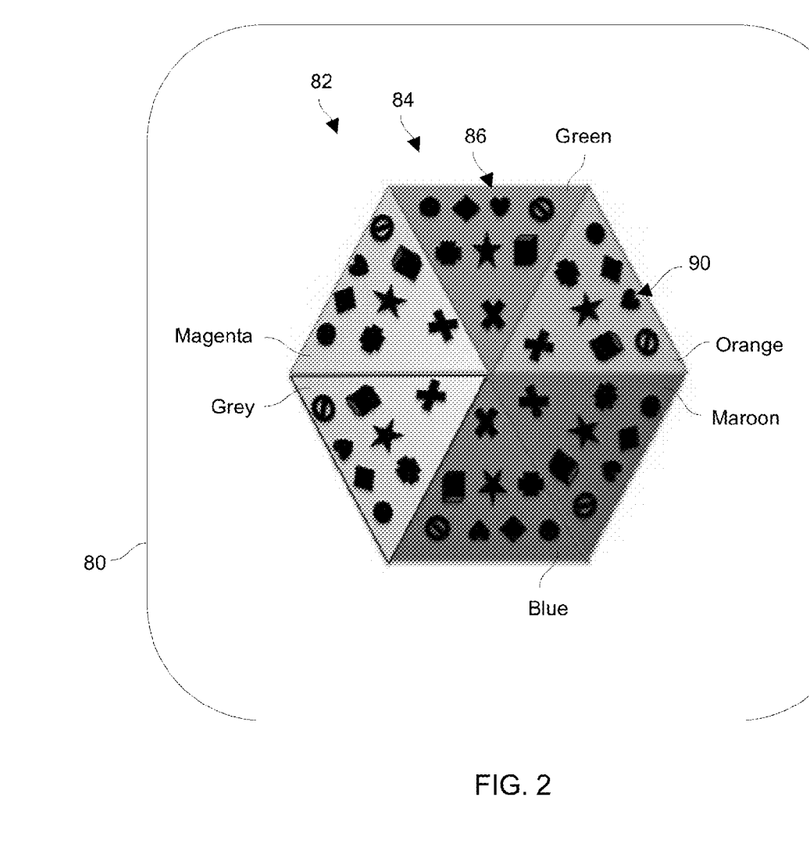
FIG. 2 is a block diagram of a color wheel which is suitable for prompting a user to provide multiple color-shape pairings during a first operating time.

FIG. 2 shows a view 80 that the processing circuitry 36 of the electronic apparatus 20 is capable of displaying on the user interface 32 (also see FIG. 1). The view 80 includes a color wheel 82 that presents a series of color segments 84 that extends from a starting point (e.g., the right side position, the bottom position, etc.) in a predefined clockwise order. By way of example only, the series of color segments 84 starting at the top position includes: a green segment, an orange segment, a maroon (or red) segment, a blue segment, a grey segment, and a magenta (or purple) segment. Other colors are suitable for use as well.

Each segment 84 of the color wheel 82 includes a collection of shapes 86 (i.e., objects, symbols, patterns, etc.). Example shapes 86 include diamonds, crosses, circles, boxes, stars, hearts, moons, letters, numbers, glyphs, and so on. In some arrangements, each segment 84 includes the same collection of shapes 86. Moreover, each segment 84 may position the shapes 86 in the same locations (see FIG. 2) or in different locations. In other arrangements, the segments 84 can include different collections of shapes 86. Such various combinations and permutations provides greater unpredictability.

It should be understood that the color wheel 82 may include a different number of segments 84 (e.g., four, five, eight, etc.). However, the six segments 84 forming the hexagon shown in FIG. 2 enables each segment 84 (i.e., an equilateral triangle)

to provide a relatively large area conducive to displaying many shapes 86 and convenient to receiving user selections.

To properly authenticate, a user is challenged to enter a sequence of color-shape pairings 50 into the electronic apparatus 20. For example, if the user interface 32 includes a touch screen, the user simply touches particular shapes 86 residing in a particular color segment 84. However, if the user interface 32 includes a display and a mouse, the user may move the mouse (or other pointer) over a particular shape 86 residing in a particular color segment 84 and then click the mouse to select the particular shape 86 in the particular color segment 84. Other methodologies are suitable for use as well. Accordingly, to select a pairing of orange-heart, the user selects the heart in the orange color segment 84 (see arrow 90 in FIG. 2).

A suitable authentication code is a user-entered set which contains multiple color-shape pairings 50. The user can simply touch a particular object 86 in a particular color segment 84 to enter a color-shape pairing 50. The user then repeats this action to enter a second color-shape pairing 50, and again to enter a third color-shape pairing 50, and so on. The strength of the authentication code increases with the number of color-shape pairings 50 in the user-entered set (e.g., at least three pairings 50, four, five, six, seven, eight, etc.). For example, a suitable authentication code having a series of six color-shape pairings 50 can be as follows: orange-heart, magenta-star, magenta-circle, green-star, maroon-circle, grey-diamond.

The electronic apparatus 20 then uses the authentication code for authentication. In some arrangements, the electronic apparatus 20 takes the entered color-shape pairings 50 as inputs to a key derivation function and generates a key which is used for access control. For example, a controller formed by the processing circuitry 36 executing the application 42 (FIG. 1) can derive, as an access control result, a cryptographic key from a series of color-shape pairings 50 obtained in response to the user touching touch screen locations over the particular shapes residing in the particular color segments. The key is configured to unlock access to the set of protected resources 44. Along these lines, the key can be used to decrypt a collection of tokens where each token is configured to unlock access to a respective protected resource 44. In some situations, the protected resource 44 is an app which is capable of remotely accessing another application, content, or data from an external device through the network interface 30.

In other arrangements, the electronic apparatus 20 matches the user-entered set of color-shape pairings 50 with an expected set of color-shape pairings 50. Authentication is successful when the user-entered set of color-shape pairings 50 matches the expected set of color-shape pairings 50.

In some arrangements, the user may select the color-shape pairings 50 in any order. In other arrangements, the user must select the color-shape pairings 50 in a precise order, i.e., the authentication code is order dependent.

If user authentication is successful, the electronic apparatus 20 allows the user to access the protected resources 44. For example, a generated cryptographic key can be used to unlock other cryptographic keys and resources, tokens, files, etc. However, if user authentication is unsuccessful, the electronic apparatus 20 denies access to the protected resources 44. Of course, a remedial activity may take place such as sending a warning to an administrator, providing the user with another opportunity to authenticate, step-up authentication, locking out the user after a predefined number of unsuccessful authentication attempts, and so on.

Figure 3:
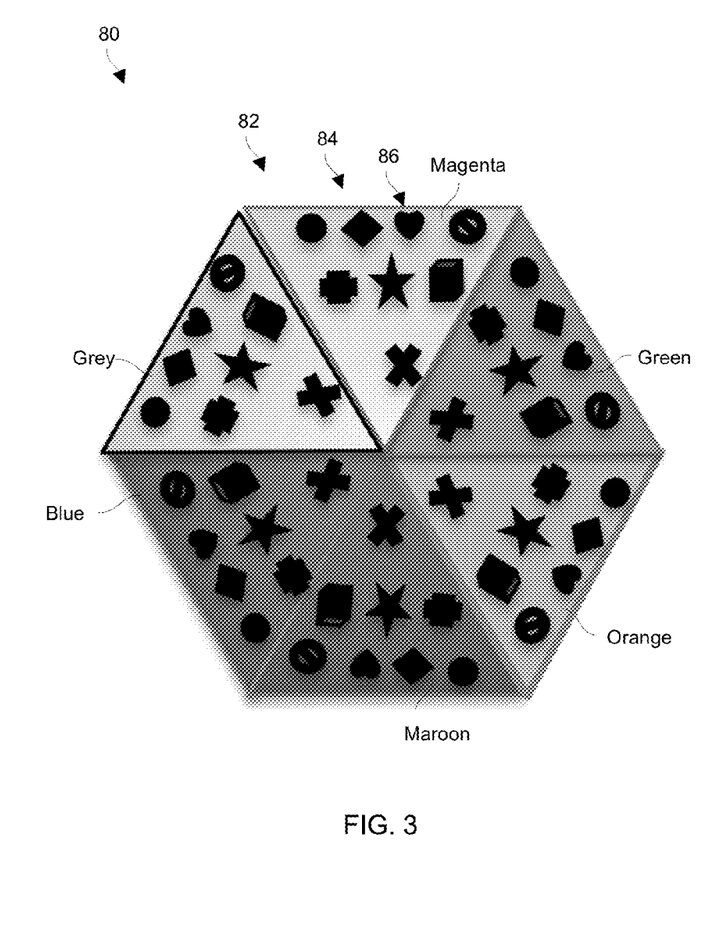
FIG. 3 is a block diagram of the color wheel during a second operating time.
Figure 4:
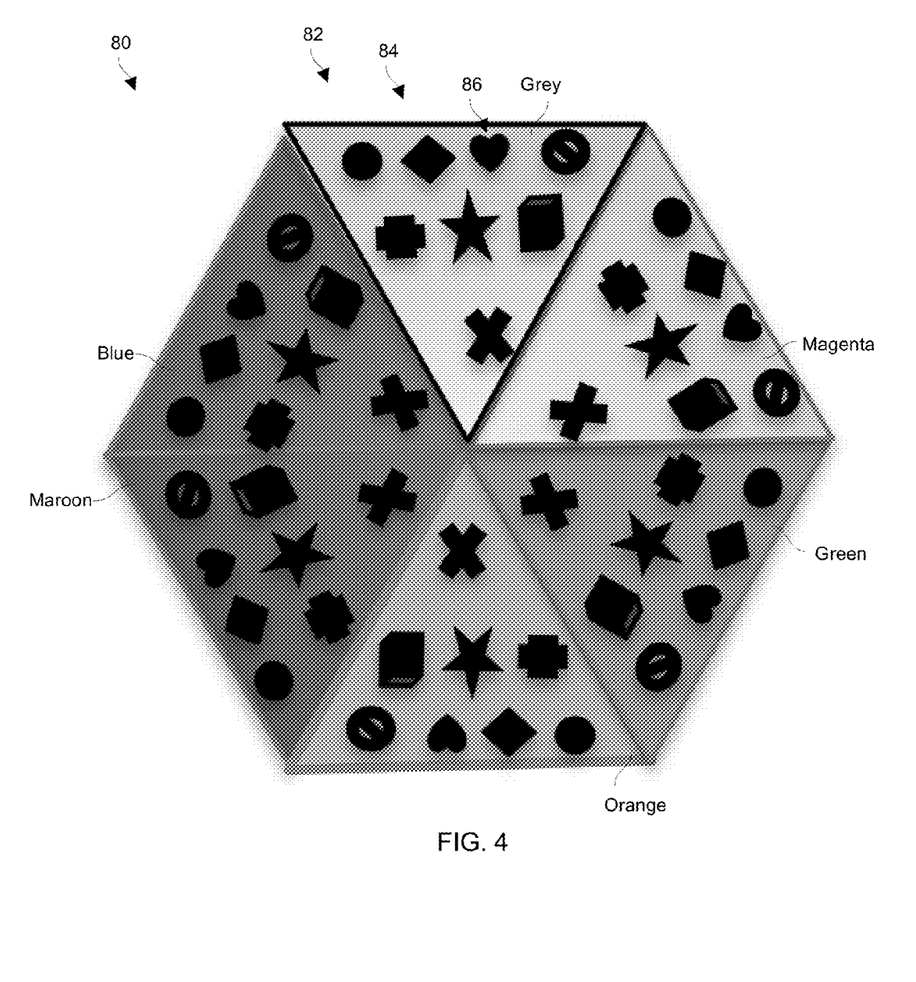
FIG. 4 is a block diagram of the color wheel during a third operating time.
Figure 5:
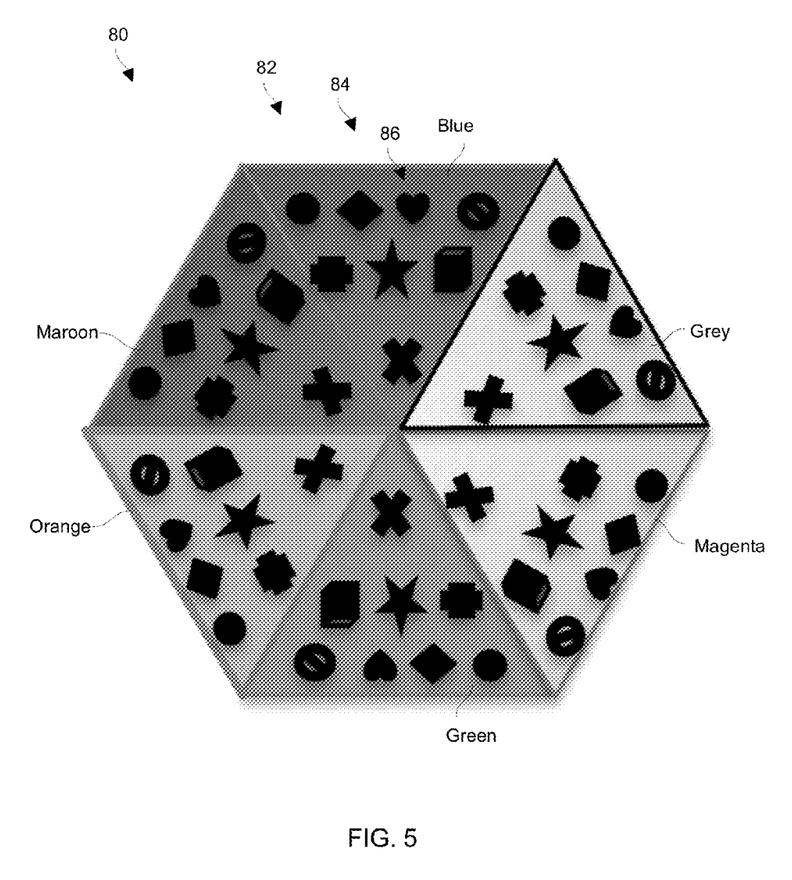
FIG. 5 is a block diagram of the color wheel during a fourth operating time.

In some arrangements, the color wheel 82 changes orientation (e.g., rotates in increments such as multiples of 60 degrees when there are six segments 84) during different authentication attempts. For example, FIGS. 3 through 5 show different orientations for the color wheel 82 during subsequent authentication attempts. By way of example, the color wheel 82 is rotates clockwise by 60 degrees during each successive authentication attempt.

As shown in FIG. 3, the view 80 of the color wheel 82 is rotated clockwise by 60 degrees from the view 80 in FIG. 2. That is, FIG. 3 shows the color wheel 82 during an authentication attempt following the one associated with FIG. 2. In FIG. 3, the color segments 84 have shifted so that all of the color segments 84 are still visible to the user. Moreover, each color segment 84 includes multiple objects 86 which are available for selection.

Since the user has to touch different screen locations on the color wheel 82 of FIG. 3 in order to enter the same series of color-shape pairs 50 vis-à-vis the color wheel 82 of FIG. 2, the user cannot rely on smudges on a touch screen. Likewise, FIG. 4 shows the color wheel 82 during an authentication attempt following the one associated with FIG. 3, FIG. 5 shows the color wheel 82 during an authentication attempt following the one associated with FIG. 4, and so on.

It should be understood that the user is challenged to enter the proper authentication code (i.e., a correct series of color-shape pairings 50) regardless of the current orientation of the color wheel 82. Moreover, in some arrangements, the shapes and/or shape locations can change from one authentication attempt to another. Such operation makes the challenge independent of the same screen coordinates, smudges on a touch screen, and so on.

In some arrangements, the color wheel 82 rotates in the counterclockwise direction between authentication attempts. In some arrangements, the color wheel 82 rotates more than 60 degrees between authentication attempts (e.g., 120 degrees, 180 degrees, etc.). In some arrangements, the color segments 84 change position randomly between authentication attempts thus strengthening security (e.g., clockwise then counterclockwise). For example, the color segments 84 can be randomly shuffled, reversed/flipped, etc. so that the color order changes for each authentication attempt. Further details will now be provided with reference to FIG. 6.

Figure 6:
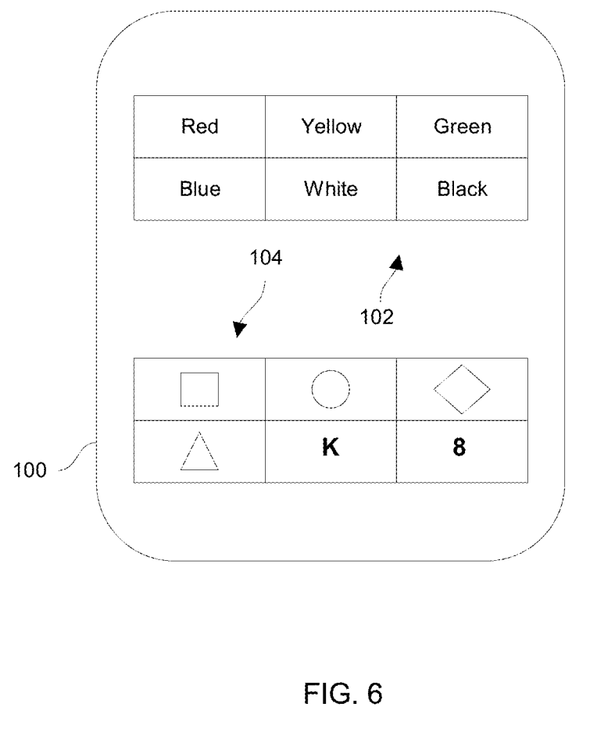
FIG. 6 is a block diagram of an interface which is an alternative to that of the color wheel of FIGS. 2 through 6.

FIG. 6 shows an alternative view 100 that can be displayed on the user interface 32 of the electronic apparatus 20 (also see FIG. 1). The view 100 includes a color palette 102 and a shape menu 104. The color palette 102 offers the user a variety of color selections. The shape menu 104 offers the user a variety of shape selections.

Although FIG. 6 illustrates various colors using words, it should be understood that the view 100 can simply include the color itself, or even the color and the word. Likewise, the various shape selections can be outlined, solids, shaded or patterned, and so on.

Using the view 100, the user provides a series of user gestures (e.g., finger swipes, stylus/pen strokes, mouse movements, etc.). In particular, the user can drag and drop a color selection onto a shape selection. For example, in the context of a touch screen, touching and dragging the green cell of the color palette 102 over the diamond of the shape menu 104 enters the color-shape pair "green-diamond".

Alternatively, the user can drag and drop a shape selection onto a color selection. For example, touching and dragging the circle cell of the shape menu 104 over the black cell of the color palette 102 enters the color-shape pair "black-circle".

In some arrangements, the electronic apparatus 20 draws a distinction between whether a color is dragged on to a shape, or whether a shape is dragged on to a color. For example, a user input based on dragging the color green over the diamond to enter "green-diamond" is different than another user input based on based on dragging the diamond over the color green to enter "diamond-green". That is, such direction-based gestures are considered to be different thus increasing the number of possible selections for a user (i.e., unpredictability).

The end result is a series of user-entered color-shape pairings 50 that can be used as input to a key derivation function to generate a key, or that can be compared to an expected set of color-shape pairings 50. Such a view 100 is well suited for a touch screen in which the user enters a sequence of swiping motions. Nevertheless, other user interfaces are suitable as well (e.g., touch pads, mice, trackballs, etc.).

It should be understood that the positions of the colors can change within the color palette 102 between different authentication attempts. Similarly, the positions of the shapes can change within the shape menu 104 between different authentication attempts. In some arrangements, the changes are randomized (e.g., shuffled) to strengthen security. Further details will now be provided with reference to FIG. 7.

Figure 7:
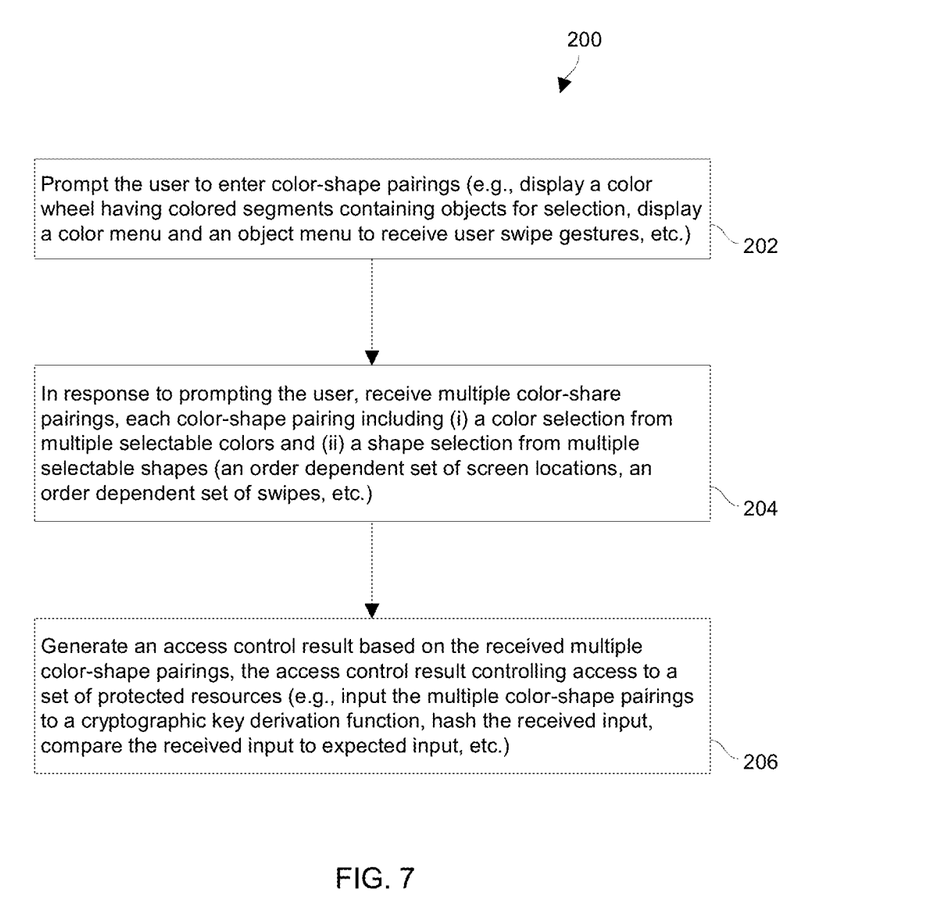
FIG. 7 shows a flowchart of a procedure which is capable of being performed by the electronic apparatus of FIG. 1.

FIG. 7 is a flowchart of a procedure 200 that is performed by the electronic apparatus 20 to generate a key. At 202, the electronic apparatus 20 prompts the user to enter multiple color-shape pairings. In some arrangements, the electronic apparatus 20 displays a color wheel (see FIG. 2). In other arrangements, the electronic apparatus 20 displays menus (see FIG. 6). Other display configurations are suitable for use as well.

At 204, the electronic apparatus 20, receives multiple color-shape pairings in response to prompting the user. In particular, a user operates a user interface (FIG. 1) to select a color and a shape for each color-shape pairing (also see FIGS. 2-6). Each color-shape pairing includes (i) a color selection from multiple selectable colors and (ii) a shape selection from multiple selectable shapes.

In some arrangements, the shape within the color may have a different color than the background color. For example, the shape color may be black, but the background color may be orange. In such arrangements, the particular background color is the color that is considered selected by the user.

At 206, the electronic apparatus 20 generates an access control result based on the received multiple color-shape pairings, the access control result controlling access to a set of protected resources. The access control result determines whether the user is granted or denied access to a set of resources.

In some arrangements, the electronic apparatus 20 can provide the multiple color-shape pairings as inputs to a key derivation function to create a key (e.g., with order dependency). In some arrangements, key generation is dependent on the order of the multiple color-shape pairings. In some arrangements, the key derivation function takes additional inputs (e.g., stable values of other parameters from the electronic apparatus 20 such as serial number data, component identifiers, module IDs, etc.) as well. In some arrangements, access control involves decrypting a bag of tokens or other keys, file decryption, certificate generation, for login access, for application access, for secure communications, and so on.

In other arrangements, the electronic apparatus 20 compares the entered multiple color-shape pairings to expected multiple color-shape pairings. The expected multiple color-shape pairings can be programmed into the electronic apparatus 20 during an enrollment process. This comparison may be performed locally within the electronic apparatus 20 or involve communication with an external device such as an external authentication server. In these arrangements, the access control result has (i) a first value indicating that user authentication is successful when the entered multiple color-shape pairings match the expected multiple color-shape pairings and (ii) a second value indicating that user authentication is unsuccessful when the entered multiple color-shape pairings do not match the expected multiple color-shape pairings. The second value is different than the first value. Further details will now be provided with reference to FIG. 8.

Figure 8:
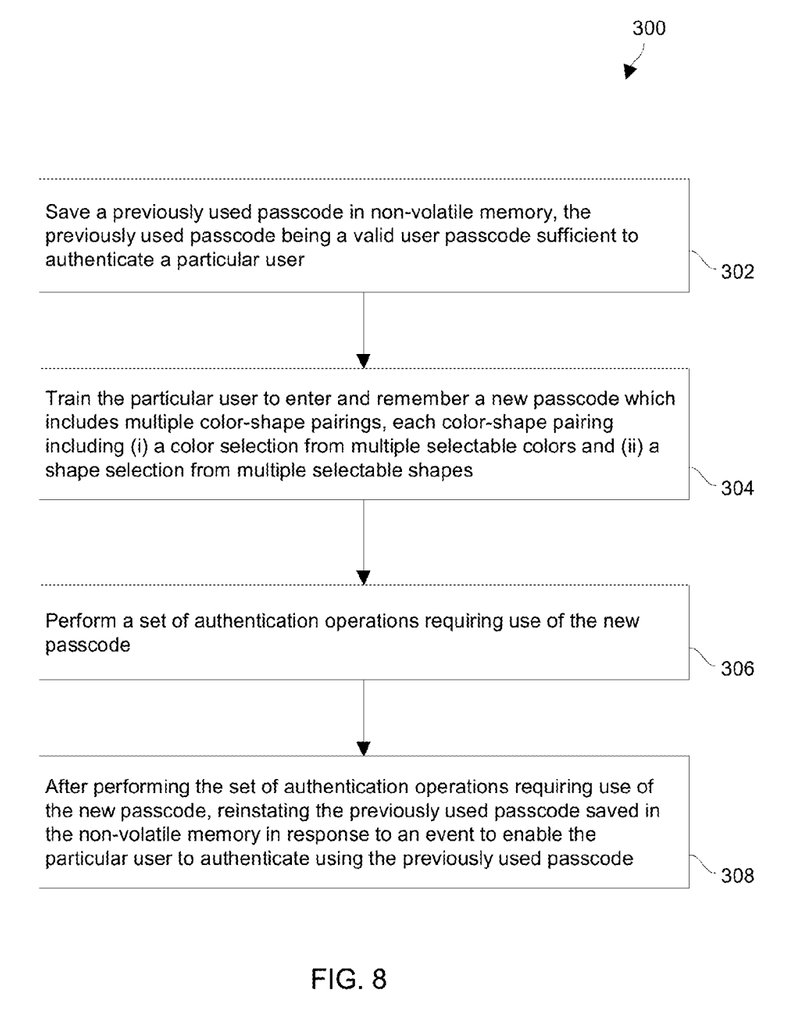
FIG. 8 shows a flowchart of another procedure which is capable of being performed by the electronic apparatus of FIG. 1.

FIG. 8 is a flowchart of a procedure 300 that is performed by the electronic apparatus 20 to authenticate a user. The procedure 300 is suitable for use by the electronic apparatus 20 if the user finds it difficult to migrate from a previously used authentication process to a new authentication process that uses multiple color-shape pairings.

At 302, the electronic apparatus 20 saves a previously used passcode in memory. The previously used passcode is a valid user passcode that is sufficient to authenticate a particular user.

At 304, the electronic apparatus 20 trains the particular user to enter and remember a new passcode that includes multiple color-shape pairings. Each color-shape pairing includes (i) a color selection from multiple selectable colors and (ii) a shape selection from multiple selectable shapes.

At 306, the electronic apparatus 20 performs a set of authentication operations requiring use of the new passcode.

At 308, electronic apparatus 20, after performing the set of authentication operations requiring use of the new passcode, reinstates the previously used passcode saved in the memory in response to an event (e.g., an override command, a certain number of failed attempts within a given amount of time after migrating to the new process, etc.) to enable the particular user to authenticate using the previously used passcode.

In some arrangements, the electronic apparatus 20 offers the user the opportunity to select a variety of different color-shape prompting configurations. For example, the user is able to choose between the view 80 (e.g., the wheel-based view of FIG. 2) and the view 100 (e.g., the menu-based view of FIG. 6), perhaps among other views. Such customization ability enables the user to select a particular view that enables the user to easily authenticate (i.e., which is less burdensome to remember the series of color-shape pairings), but nevertheless provides stronger security than that of a conventional PIN or password.

As described above, improved techniques are directed to authentication and access control techniques which involve the use of multiple color-shape pairings 50. Such use of multiple color-shape pairings 50 is capable of providing greater unpredictability than that provided by a routine PIN (or a normal password). Moreover, depending on how an interface is presented to a user, the interface may easily enable the user to remember enough color-shape pairings 50 to generate substantially higher entropy than that available from conventional PINs. For example, multiple color-shape pairings 50, in combination with a healthy set of device stable values, can offer at least 128 bits for generation of an effective cryptographic key.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components that were described above such as an authentication server or protected resource servers are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, it should be understood that, on a conventional mobile platform, many times authentication is bound to key generation. Unfortunately, data entry on mobile devices is challenging so most vendors are using conventional PINs as a password to derive a key. Therefore, most keys generated of those mobile devices have very low entropy (ranging 10-17 bits).

Even if it is assumed that some device stable values are available for use to generate a key, there still exists a need of between 40-60 bits of entropy to make an effective key (e.g., for a total of 128 bits). Accordingly, the above-described color-shape pairings 50 offer the ability to obtain higher entropy.

In particular embodiment, it should be understood that the electronic apparatus 20 can display a hexagon comprised of six triangles of different colors. On each of these colored triangles, the electronic apparatus 20 cab display six to eight shapes depending on screen resolution and size. Such shapes can be randomly positioned on each triangle. Additionally such shapes can come from a known pool, but not all colored triangles are required to have the same shapes.

In some arrangements, the relations of colors on the hexagon are fixed, but the initial angular displacement of the hexagon is random. For a user to authenticate, he/she will have to select eight shapes from any of the hexagons. For example, red-heart, maroon-X, orange-circle, etc. While the shapes are of different color, most humans will recall them as such and therefore will keep twice the entropy of a normal password.

It should be further understood that a variety of enrollment processes are available. To be able to recall the above-described method in an effective way, the following enrollment process is offered:

1. Present a video of an authentication process for selecting the different color-shape pairings. The video presents different random shapes and different selection patterns as since it can be assumed that most users will copy the behavior in the video.
2. Ask the user to select a password (e.g., a sequence of color-shape pairings).
3. Ask the user to confirm the password at least three times in gaps increasing in time (e.g., from 1 sec to 40 seconds).
4. Confirm registration, but still keep a reset option in memory (e.g., store the user's previous password).
5. Pop up an authentication request after a predefined amount of time later (e.g., five minutes) with the option to skip or reset if the user fails.
6. After the predefined amount of time has elapsed without the user canceling enrollment, the password is set and a key is generated from it.

In connection with step 2 above, in some arrangements, the circuitry carrying out the enrollment process avoids accepting "weak" password choices from the user. Along these lines, the circuitry can compare the user-provided color-share pairings against a set of tables such as one table of weak individual pairings and another table of weak overall passwords. Some obviously bad overall passwords include associating the same color with each of the different shapes (e.g., since my favorite color is blue, I'll just pick blue and various shapes), or vice-versa (e.g., just picking one shape to repeatedly pair with the same color).

One should appreciate that there may be a fair degree of subtlety here since the guessing entropy of various choices is unclear. When it comes to the weak individual pairings, some shapes (red hearts, green clovers) may have a greater-than-random chance of association with a particular color.

Additionally, it should be understood that various components such as the electronic apparatus 20 or an external authentication server that operates with the electronic apparatus 20 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, it should be understood that the above-described authentication techniques that use color-shape pairings may be combined with other authentication processes for richer and stronger authentication. For example, the color-shape pairings can serve as another authentication factor in multi-factor authentication. Additionally, such color-shape pairings may be combined with biometric authentication (e.g., user gestures, swiping rates, etc.). Furthermore, such color-shape pairings may be used in adaptive authentication, and so on.

Also, it should be understood that the above-described techniques can be configured for use by the visually impaired. Along these lines, if the user is color blind, the color segments can be adapted to include segment identifiers (e.g., numbers, letters, labels, names, shading, etc.) or other identification schemes to enable the user to distinguish the color segments from each other. Such modifications and enhancements are intended to belong to various embodiments of the disclosure.

What is claimed is:

1. A method of providing access control, the method comprising:
   prompting, by processing circuitry, a user to enter color-shape pairings;
   in response to prompting the user, receiving, by the processing circuitry and as user input, multiple color-shape pairings, each color-shape pairing including (i) a color selection from multiple selectable colors and (ii) a shape selection from multiple selectable shapes; and
   generating, by the processing circuitry, an access control result based on the received multiple color-shape pairings, the access control result controlling access to a set of protected resources;
   wherein prompting the user to enter color-shape pairings includes displaying a set of color segments on a touch screen, and rendering multiple shapes within each color segment displayed on the touch screen;
   wherein receiving the multiple color-shape pairings includes obtaining a series of color-shape pairings in response to the user touching touch screen locations over particular shapes residing in particular color segments;

wherein displaying the set of color segments on the touch screen includes presenting a color wheel in which the color segments are shown from a starting point in a predefined clockwise order; and wherein the method further comprises:

during a new authentication operation, prompting the user to enter new color-shape pairings by presenting the color wheel rotated by at least 60 degrees from an earlier displayed color wheel orientation on the touch screen, and rendering multiple shapes within each color segment of the rotated color wheel to receive a new series of color-shape pairings.

2. A method as in claim 1 wherein rendering the multiple shapes within each color segment displayed on the touch screen includes:

presenting a same collection of objects in each of the color segments displayed on the touch screen.

3. A method as in claim 1 wherein rendering the multiple shapes within each color segment displayed on the touch screen includes:

presenting a different collection of objects in each of the color segments displayed on the touch screen.

4. A method as in claim 1 wherein generating the access control result includes:

deriving, as the access control result, a key from the series of color-shape pairings obtained in response to the user touching touch screen locations over the particular shapes residing in the particular color segments, the key being configured to unlock access to the set of protected resources.

5. A method as in claim 4, further comprising:

decrypting a collection of tokens using the key, each token being configured to unlock access to a respective protected resource of the set of protected resources.

6. A method as in claim 1 wherein generating the access control result includes:

comparing (i) the obtained series of color-shape pairings and (ii) an expected series of color-shape pairings; and based on whether the obtained series of color-shape pairings matches the expected series of color-shape pairings, providing an authentication result indicating whether user authentication is successful.

7. A method as in claim 6 wherein providing the authentication result includes:

outputting a first authentication result value indicating that user authentication is successful when the obtained series of color-shape pairings matches the expected series of color-shape pairings; and outputting a second authentication result value indicating that user authentication is unsuccessful when the obtained series of color-shape pairings does not match the expected series of color-shape pairings, the second authentication result value being different from the first authentication result value.

8. A method as in claim 1 wherein prompting the user to enter the color-shape pairings includes:

in response to a message directing the processing circuitry to perform a resource access control operation, displaying a graphical diagram, which includes the color wheel, to the user which prompts the user to enter the color-shape pairings while performing resource access control.

9. A method as in claim 8 wherein receiving the multiple color-shape pairings includes:

obtaining, as a first color-shape pairing, (i) identification of a first color that the user selects from different selectable colors while the graphical diagram is displayed to the user and (ii) identification of a first shape that the user selects from different selectable shapes while the graphical diagram is displayed to the user; and obtaining, as a second color-shape pairing, (i) identification of a second color that the user selects from different selectable colors while the graphical diagram is displayed to the user and (ii) identification of a second shape that the user selects from different selectable shapes while the graphical diagram is displayed to the user, the first color being different from the second color, and the first shape being different from the second shape.

10. A method as in claim 9 wherein generating the access control result includes:

performing a first color matching operation which matches the identification of the first color of the first color-shape pairing to an expected first color for the first color-shape pairing, performing a first shape matching operation which matches the identification of the first shape of the first color-shape pairing to an expected first shape for the first color-shape pairing, performing a second color matching operation which matches the identification of the second color of the second color-shape pairing to an expected second color for the second color-shape pairing, and performing a second shape matching operation which matches the identification of the second shape of the second color-shape pairing to an expected second shape for the second color-shape pairing.

11. An electronic apparatus, comprising:

a user interface;

memory; and control circuitry coupled to the user interface and the memory, the memory storing instructions which, when carried out by the control circuitry, cause the control circuitry to:

prompt a user to enter color-shape pairings, in response to prompting the user, receive, as user input, multiple color-shape pairings, each color-shape pairing including (i) a color selection from multiple selectable colors and (ii) a shape selection from multiple selectable shapes, and generate an access control result based on the multiple color-shape pairings, the access control result controlling access to a set of protected resources;

wherein the control circuitry, when prompting the user to enter color-shape pairings, is constructed and arranged to display a set of color segments on a touch screen, and render multiple shapes within each color segment displayed on the touch screen;

wherein the control circuitry, when receiving the multiple color-shape pairings, is constructed and arranged to obtain a series of color-shape pairings in response to the user touching touch screen locations over particular shapes residing in particular color segments;

wherein the control circuitry, when displaying the set of color segments on the touch screen, is constructed and arranged to present a color wheel in which the color segments are shown from a starting point in a predefined clockwise order; and wherein the control circuitry is further constructed and arranged to:

during a new authentication operation, prompt the user to enter new color-shape pairings by presenting the color wheel rotated by at least 60 degrees from an earlier displayed color wheel orientation on the touch screen, and rendering multiple shapes within each color segment of the rotated color wheel to receive a new series of color-shape pairings.

12. A computer program product having a non-transitory computer readable medium which stores a set of instructions to provide access control, the set of instructions, when carried out by computerized circuitry, causing the computerized circuitry to perform a method of:

prompting a user to enter color-shape pairings;

in response to prompting the user, receiving, as user input, multiple color-shape pairings, each color-shape pairing including (i) a color selection from multiple selectable colors and (ii) a shape selection from multiple selectable shapes; and generating an access control result based on the multiple color-shape pairings, the access control result controlling access to a set of protected resources;

wherein prompting the user to enter color-shape pairings includes displaying a set of color segments on a touch screen, and rendering multiple shapes within each color segment displayed on the touch screen;

wherein receiving the multiple color-shape pairings includes obtaining a series of color-shape pairings in response to the user touching touch screen locations over particular shapes residing in particular color segments;

wherein displaying the set of color segments on the touch screen includes presenting a color wheel in which the color segments are shown from a starting point in a predefined clockwise order; and wherein the method further comprises:

during a new authentication operation, prompting the user to enter new color-shape pairings by presenting the color wheel rotated by at least 60 degrees from an earlier displayed color wheel orientation on the touch screen, and rendering multiple shapes within each color segment of the rotated color wheel to receive a new series of color-shape pairings.

\* \* \* \* \*